Jan. 5, 1937.   H. W. HEM   2,066,624
WEIGHING SCALE
Filed Feb. 15, 1935   6 Sheets-Sheet 1
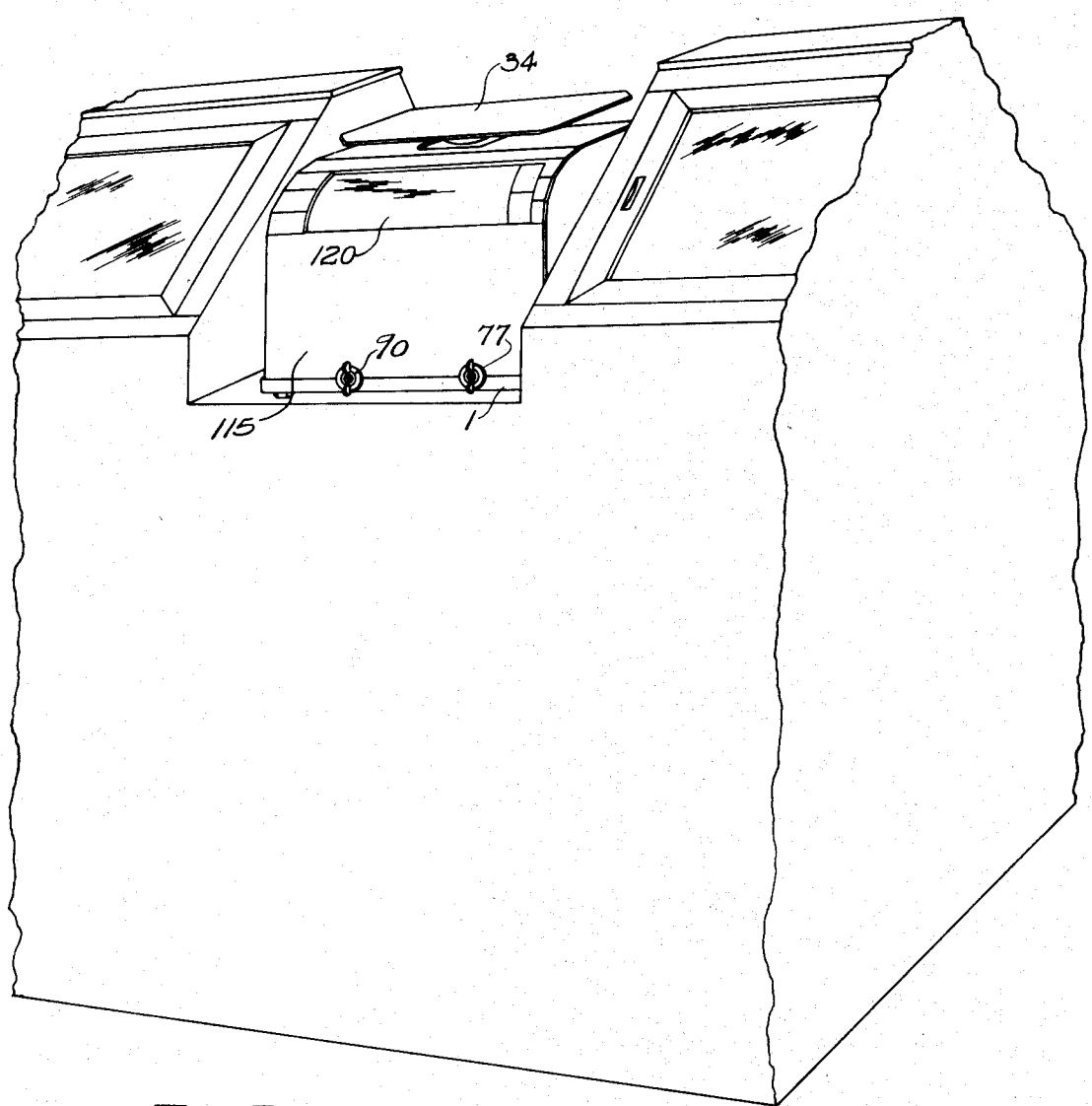
Fig. I
Halvor W. Hem
INVENTOR
BY  BWMarshall
ATTORNEY Jan. 5, 1937. H. W. HEM 2,066,624
WEIGHING SCALE
Filed Feb. 15, 1935 6 Sheets-Sheet 2
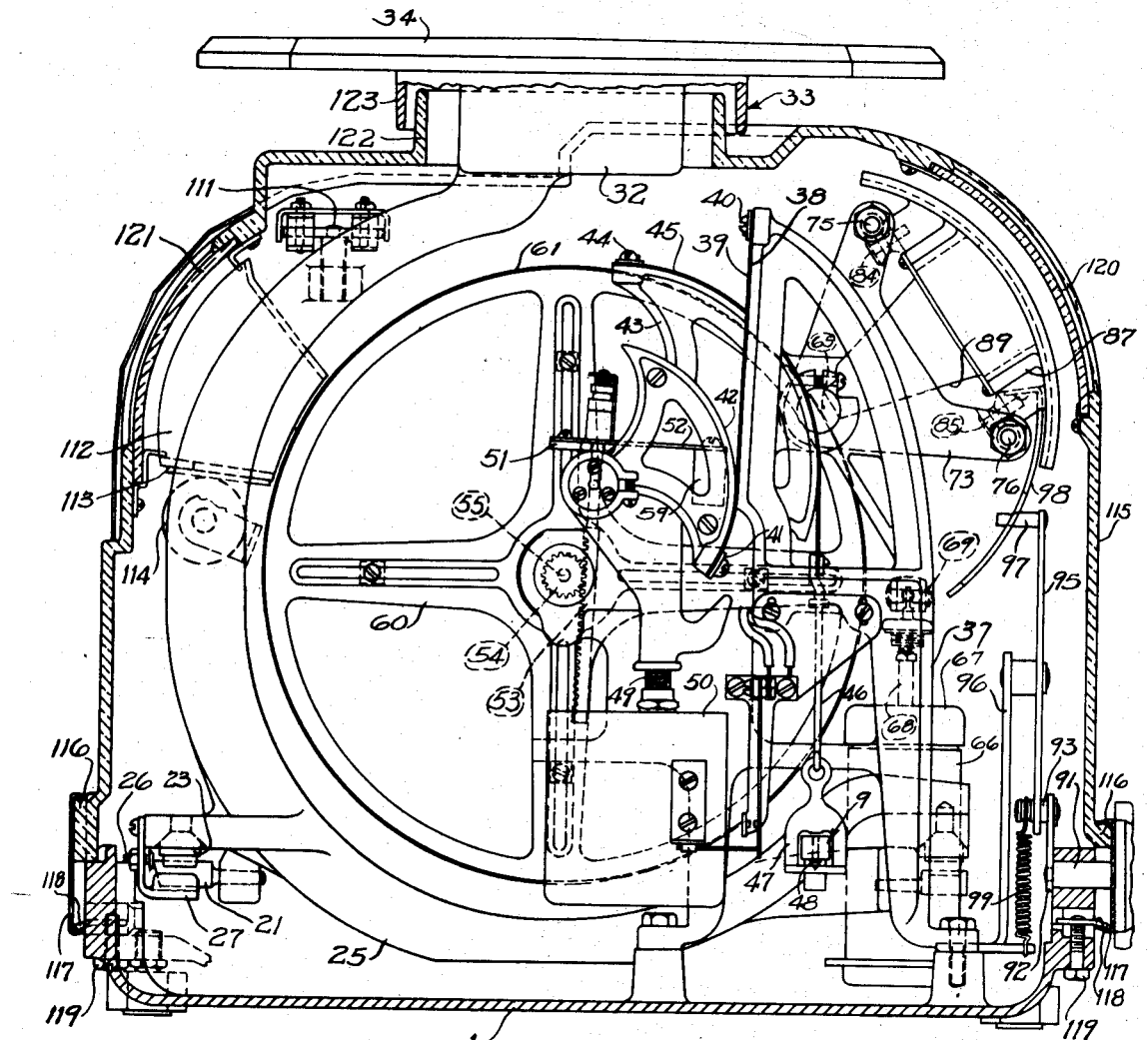
Fig. II
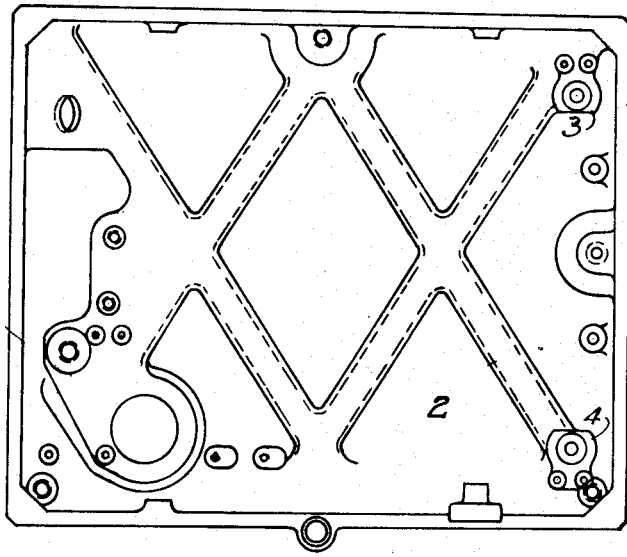
Fig. VI
Halvor W. Hem
INVENTOR
BY C. D. Marshall
ATTORNEY

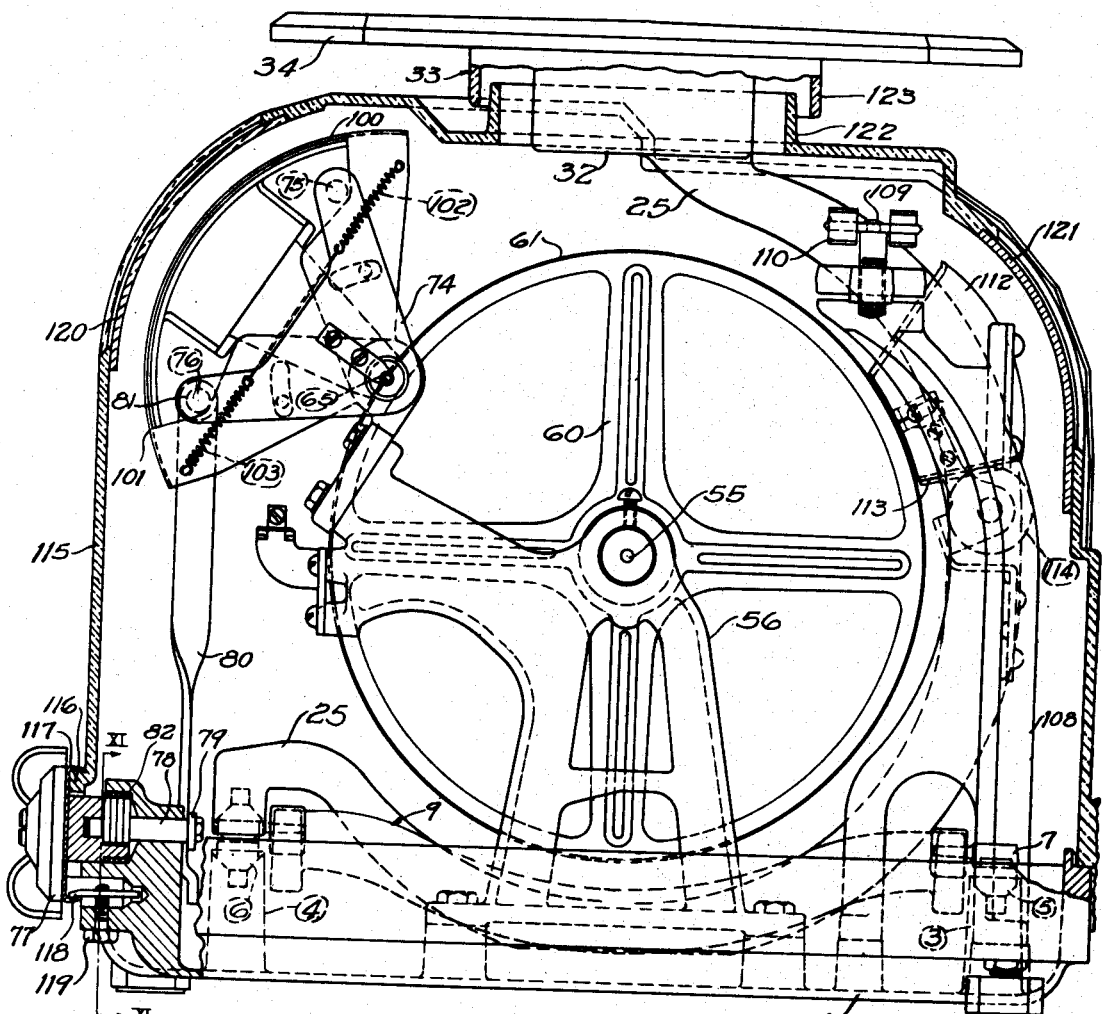

Jan. 5, 1937.  H. W. HEM  2,066,624
WEIGHING SCALE
Filed Feb. 15, 1935  6 Sheets-Sheet 4
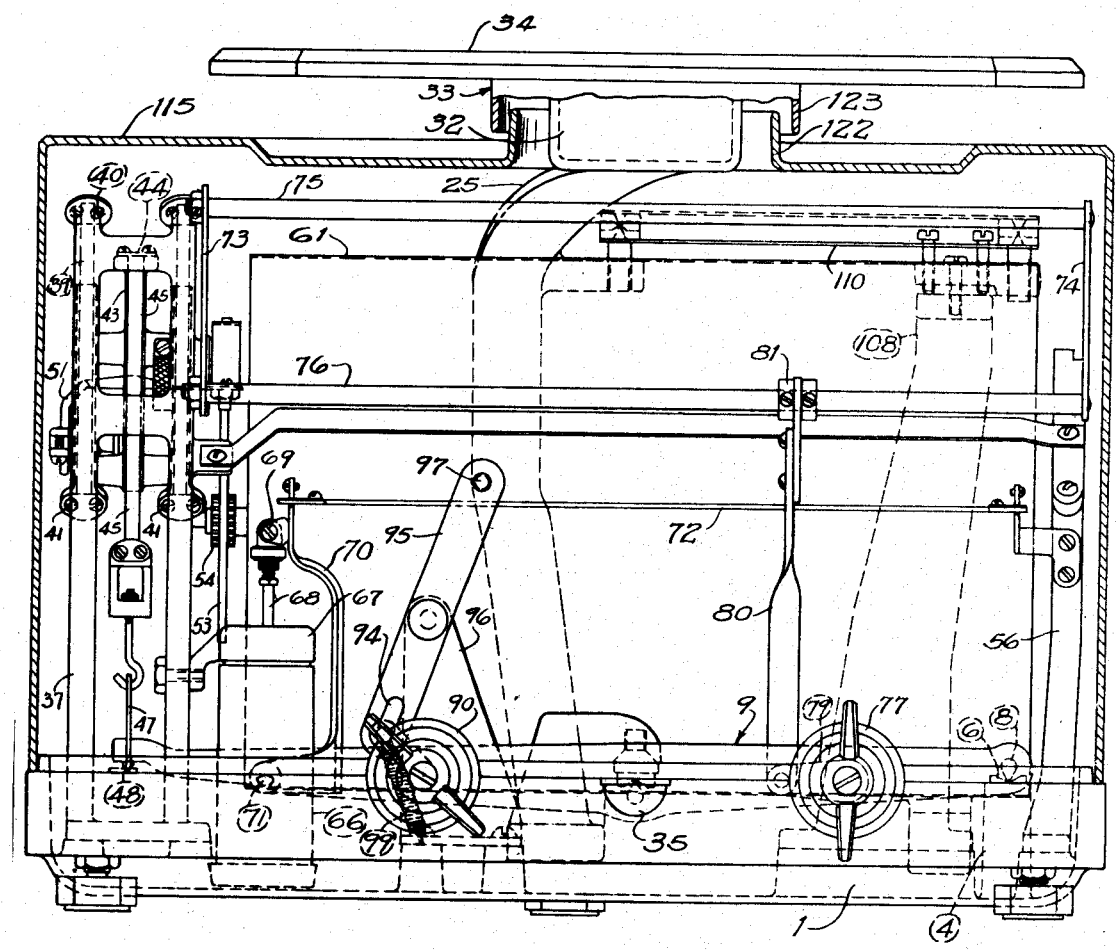
Fig. IV
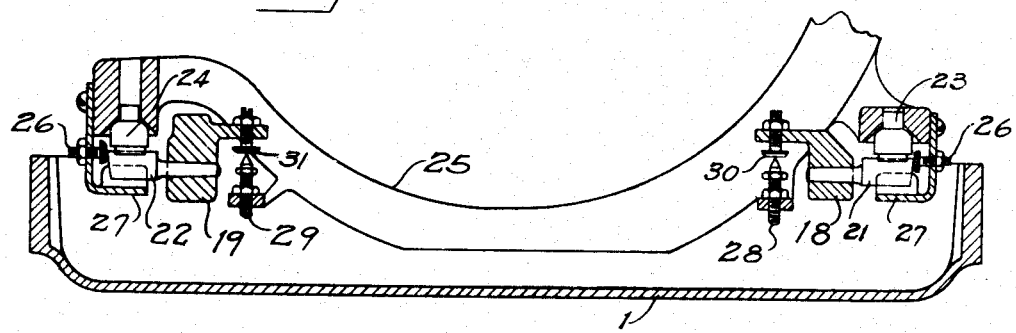
Fig. VIII
Halvor W. Hem
INVENTOR
BY *C. D. Marshall*
ATTORNEY

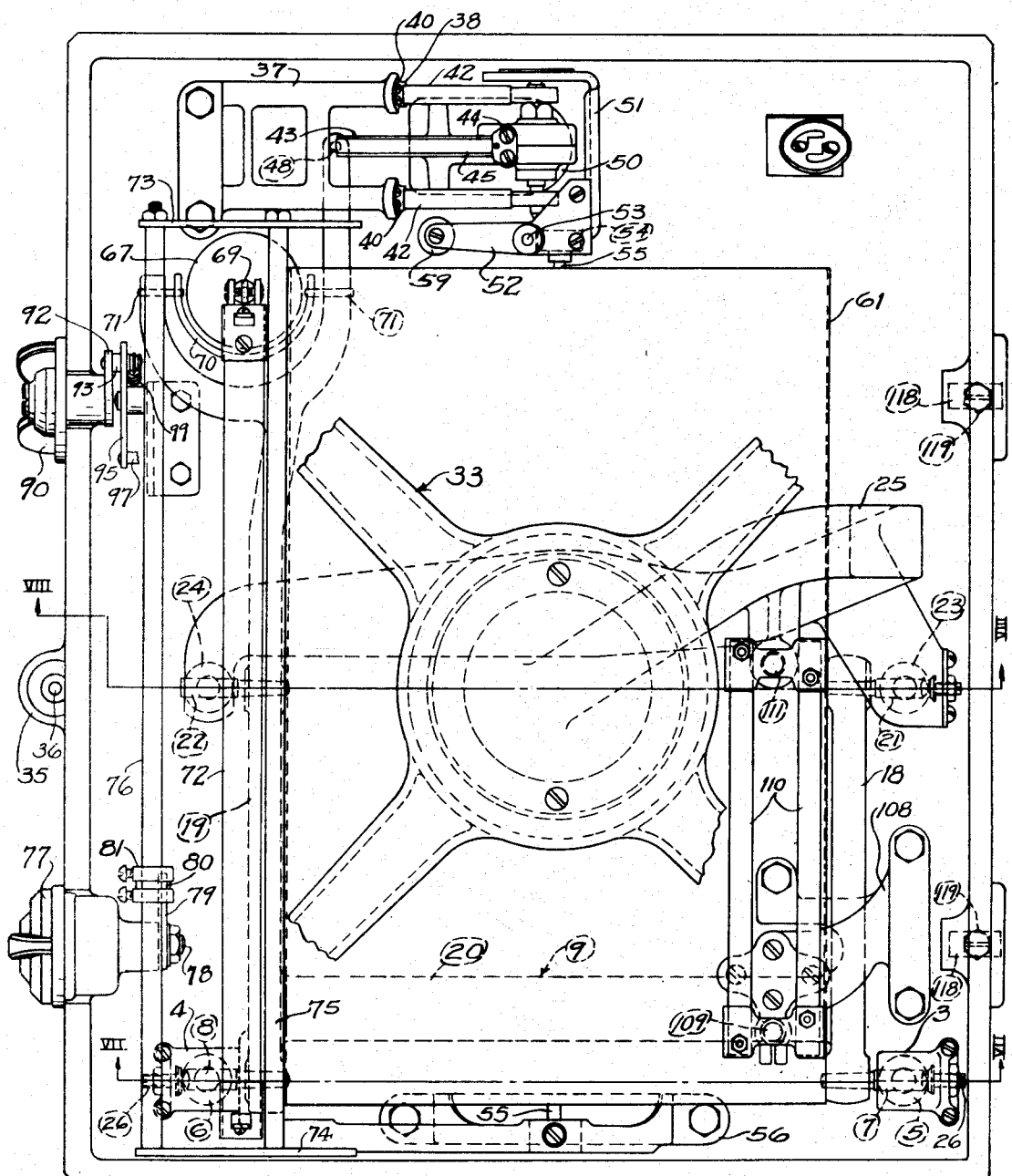
Fig. V

Jan. 5, 1937.  H. W. HEM  2,066,624
WEIGHING SCALE
Filed Feb. 15, 1935  6 Sheets-Sheet 6
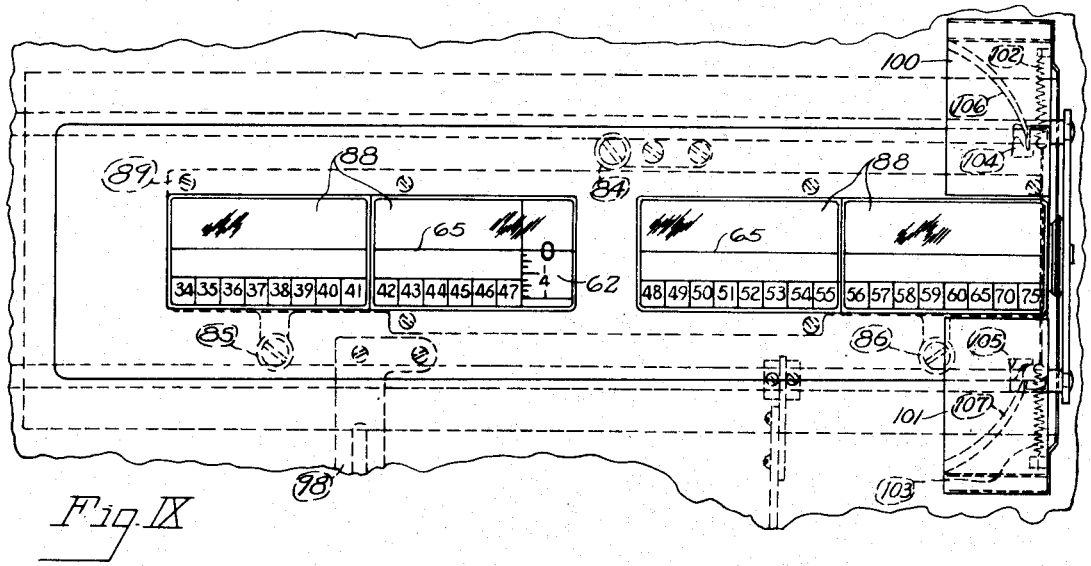
Fig. IX
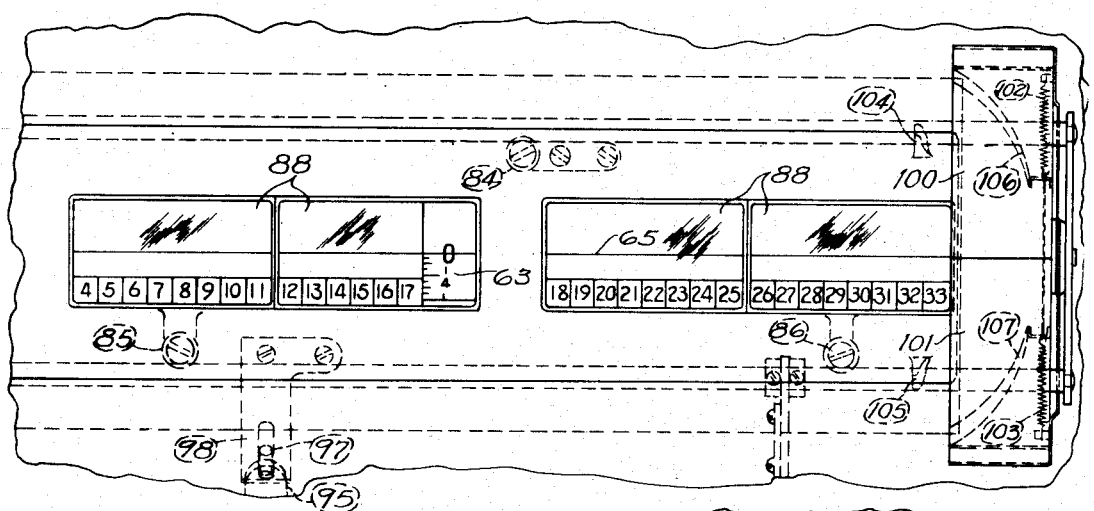
Fig. X
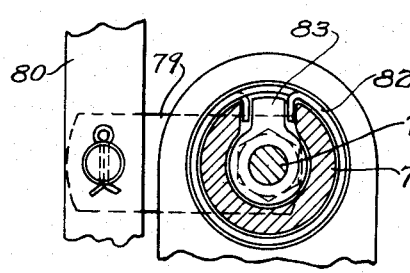
Fig. XI
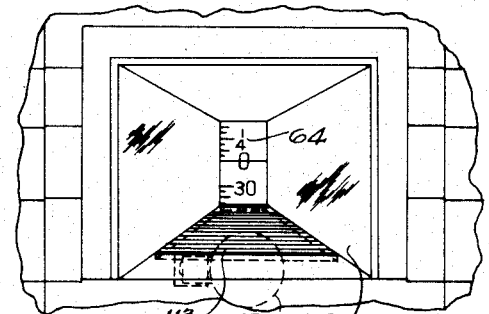
Fig. XII
Halvor W. Hem
INVENTOR
BY C. W. Marshall
ATTORNEY Patented Jan. 5, 1937

2,066,624

UNITED STATES PATENT OFFICE 2,066,624

WEIGHING SCALE

Halvor W. Hem, Toledo, Ohio, assignor to Toledo Scale Manufacturing Company, Toledo, Ohio, a corporation of New Jersey Application February 15, 1935, Serial No. 6,723

16 Claims. (Cl. 265—37)

This invention relates to weighing scales, of the general type illustrated and described in United States Patent No. 722,173 to Stuart A. Brown, having weighing mechanism and a cylindrical indicating chart located within a housing provided with openings on opposite sides through which the chart is visible, and having a goods platter lying above the housing.

It is an object of the invention to provide an improved scale of this type which is so compact as to occupy a minimum of open counter space and capable of fitting into scale wells or recesses in refrigerator counters, which often are of dimensions sufficient only to receive the narrow bases of scales having their indicating cylinders located in upstanding columns.

It is a further object of the invention to incorporate in a structure of the utmost compactness a chart of large dimensions, which, therefore, is capable of carrying as many readable value computations as ordinarily are carried by cylindrical charts of prior art computing weighing scales in which such charts are located at the upper ends of upstanding columns.

It is another object of the invention to provide a computing weighing scale having a goods platform located substantially centrally above and overlying a cylindrical chart.

Another object of the invention is to provide a scale of the above-mentioned type the parts and assembly of which have great strength and rigidity but which nevertheless is of such light weight that it can easily be picked up by one person and moved from place to place.

Another object of the invention is to provide a scale of the above-mentioned type having easily manipulated means for reliably holding the mechanism against movement during transportation.

Another object of the invention is to provide a scale of the above-mentioned type having a cylindrical chart which, notwithstanding its central location, may be assembled and replaced without dismantling the weighing mechanism.

Another object of the invention is the provision of a scale of the above-mentioned type in which the platform, check link, and lever mechanism are so organized as to minimize the tendency of the load-supporting bearings to shift on their pivots when loads are applied at the extreme edges of the goods platform.

Another object of the invention is the provision of a scale of the above-mentioned type having yieldable means for holding the lever fulcrum pivots in their bearings.

Another object of the invention is the provision of a scale of the above-mentioned type having non-friction means for limiting movement of the load bearings away from the load pivots.

Another object of the invention is to provide a scale of the above-mentioned type having a rigid base and framework for supporting the mechanism, and a removable protective casing of synthetic plastic material, with means for reliably securing the casing to the base without subjecting the base to strains.

Another object is the provision of simple and effective means for so mounting a level on the base that the level is visible whether or not the casing is in place.

Another object of the invention is the provision of easily manipulated means for shifting magnifying lenses longitudinally of the chart.

Another object is the provision of novel shutter means to hide the space left vacant when lenses are so shifted.

Another object of the invention is the provision of means whereby such magnifying lenses may be tilted to facilitate reading of the chart by persons of different heights.

Another object is the provision of means for improving the visiblity of the so-called "customer's weight indication".

Other objects and advantages will be apparent from the following description, in which reference is had to the accompanying drawings illustrating a preferred embodiment of my invention and wherein similar reference numerals designate similar parts throughout the several views.

In the drawings:—

Figure I is a view in perspective of a scale embodying my invention, the scale being shown as installed in the scale well of a refrigerator counter.

Figure II is a left-side elevational view of the mechanism of the scale of my invention, the base and casing being shown in section.

Figure III is a right-side elevational view of the mechanism of the scale of my invention, the load-counterbalancing mechanism and the framework supporting the same being omitted, the base being partly broken away and partly shown in section, and the casing being shown in section.

Figure IV is a front elevational view of the mechanism of the scale of my invention, the shiftable magnifying lenses being omitted and the casing being shown in section.

Figure V is a plan view of the mechanism of the scale of my invention, the goods platform, casing and magnifying lenses being removed and the platform spider being partly broken away.

Figure VI is a reduced plan view of the base of the scale of my invention, showing its ribbed construction.

Figure VII is a fragmentary sectional elevation taken substantially on the line VII—VII of Figure V.

Figure VIII is a fragmentary sectional elevation taken substantially on the line VIII—VIII of Figure V.

Figure IX is a fragmentary front elevational view showing the magnifying mechanism in position for reading values at high prices per pound.

Figure X is a similar view showing the magnifying mechanism in position for reading values at low prices per pound.

Figure XI is a fragmentary view, partly in section, taken on the line XI—XI of Figure III, showing a detail of the lens tilting mechanism; and Figure XII is a fragmentary rear elevation showing the "customer's weight indication".

Referring to the drawings in detail, the base 1 of the scale is preferably an aluminum casting shaped substantially like a shallow, rectangular pan, having diagonal ribs 2 formed in its bottom. (See Figure VI.)

As shown in Figure VII, formed within the pan-like base 1 and upstanding from the bottom thereof adjacent the right end of the base are hollow bosses 3 and 4 having sockets in their upper ends in which are mounted bearings 5 and 6 that support fulcrum pivots 7 and 8 of a load-supporting lever 9.

In order that the fulcrum pivots 7 and 8 may be reliably held in their bearings, a pair of chisel-ended members 10 and 11 are so mounted on the lever 9 that they may be adjusted to bring their chisel ends into alignment with the edges of the pivots 7 and 8. U-shaped links 12 and 13, having recesses in their upper arms which engage the chisel ends, are urged downwardly by coil springs 14 and 15 compressed between the lower arms of the U-shaped links and brackets 16 and 17 secured to short bosses formed on the bottom of the base 1. The flexibility of the holding means permits slight movement of the chisel ends during weighing, without binding or appreciable friction. It is, therefore, unnecessary that the alignment of the chisel ends of the members 10 and 11 and the edges of the pivots 7 and 8 be exact.

The lever 9 has two main branches 18 and 19 rigidly connected together by a crossbar 20, the branches 18 and 19 respectively carrying load pivots 21 and 22. (See Figure V.)

Engaging the load pivots 21 and 22 are bearings 23 and 24 which are mounted in sockets in a C-shaped frame 25.

Relative endwise shifting of the load and fulcrum pivots and bearings is limited by adjustable end thrusts 26 mounted on the bearing-carrying members and engaging points at the ends of the pivots, and the pivots are shielded by caps 27. (See Figures VII and VIII.)

The load bearings 23 and 24 are held in reliable engagement with the edges of the load pivots 21 and 22 by means of cone-pointed members 28 and 29 adjustably mounted on the C-shaped frame 25 and engaging thrust members 30 and 31 adjustably mounted on the branches 18 and 19 of the lever 9. By properly adjusting the positions of the cone-pointed members 28 and 29 and the thrust members 30 and 31, their points of engagement may be brought into substantial alignment with the edges of the load pivots 21 and 22, so that no binding or friction results during weighing movements. (See Figure VIII.)

At its upper end the C-shaped frame is formed into a loading box 32, and adjustably secured upon the loading box is a platform spider 33 which supports a goods platform 34.

The base 1 is provided with a forwardly projecting lug 35 upon which is mounted a level bulb 36 (see Figure V). The level bulb so mounted is visible whether or not a casing is in place on the base.

Formed within the base 1 and rising from the bottom thereof adjacent its left end are bosses 15 and secured thereupon is an upstanding bracket 37 (best shown in Figure II) having nearly vertical faces 38 against which hang ribbons 39, the upper ends of the ribbons 39 being secured, as at 40, to the bracket 37. The lower ends of the ribbons 39 are secured, as at 41, to the lower ends of fulcrum sectors 42, and rigidly fixed between the fulcrum sectors 42 is a power sector 43, to the upper end of which is secured, as at 44, a ribbon 45 which overlies the curved face of the power sector 43 and is connected at its lower end to the upper end of a link 46, the lower end of the link 46 being connected to a stirrup 47 which engages a cone-pointed pivot 48 fixed in the nose of the load-supporting lever 9. The nearly vertical faces 38 of the bracket 37 are sloped slightly to insure that the fulcrum sectors 42 will be held against them by gravity.

Adjustably fixed to the fulcrum and power sectors 42 and 43 is a pendulum stem 49, to the lower end of which is adjustably fixed a pendulum weight 50.

The center of mass of the pendulum assembly, including the fulcrum and power sectors, is located at one side of the ribbons 39, while the force exerted by the load is applied at the opposite side. The ribbons 39 thus constitute the fulcrum of the load-counterbalancing pendulum. The mass of the pendulum assembly is such and is so located when in the position shown in Figure II as to offset the force exerted on the ribbon 45 by the weight of the lever 9, C-shaped frame 25, platform spider and goods platform and other parts carried by the lever. Hence, no separate counterbalance is required for these parts.

The organization of the goods platform 34, the platform spider 33, the C-shaped frame 25, the lever 9, the bracket 37, the power sector 43, the fulcrum sectors 42 and the pendulum stem 49 and weight 50, and the connections, is such that when a load is placed upon the goods platform 34 the force of gravity acting upon the load is transmitted to the power sector 43, thus causing the pendulum weight 50 to swing outwardly and upwardly and the fulcrum sectors to roll upwardly along the nearly vertical faces 38 of the bracket 37 until a position is reached in which the load on the goods platform is counterbalanced.

Pivotally supported, by non-friction bearings, on an axis lying at the center of curvature of the fulcrum sectors 42 is a rack foot 51 upon which is fixed a horizontally-extending resilient leaf 52 and mounted for vertical adjustment on the leaf 52 is a rack 53. The rack 53 meshes with a pinion 54 fixed upon one end of a chart shaft 55, the end of the chart shaft adjacent the pinion 54 being mounted in non-friction bearings in the bracket 37, while the remote end of the chart shaft 55 is mounted in a non-friction bearing in a bracket 56 which is secured to bosses formed upon the bottom of the base 1 adjacent its right end.

A small weight 59, secured to the leaf 52, serves to urge the teeth of the rack 53 gently into full mesh with the teeth of the pinion 54.

Fixed to the chart shaft 55 are light, skeleton chart spiders 60 to the peripheries of which is fixed a sheet of thin aluminum formed into a cylinder 61 and upon which are printed weight characters 62 and 63 visible to the merchant from one side of the scale and weight characters 64 which are visible to the customer from the other side of the scale. The chart also bears printed value characters arranged in the manner shown and described in United States Patent No. 1,973,685; the value characters, because of their multiplicity and small size, being omitted from the drawings of the instant application.

Supported at one end by the bracket 37 and at the other end by the bracket 56 and stretched along the merchant's side of the chart 61 in close proximity to the chart surface is a reading or index line 65. As the fulcrum sectors 42 roll upwardly along the nearly vertical faces 38 of the bracket 37, the rack 53, being supported at the center of curvature of the fulcrum sectors 42, moves upwardly in a direction parallel to the faces 38, thus turning the pinion 54 and the chart 61 to a position in which the weight characters corresponding to the load on the goods platform are in registration with the reading line 65.

Changes in the condition of plumbness of the connection from the nose of the lever 9 to the power sector 43 are not great, the variation in lever arm resulting from the eccentricity of the power sector being nearly compensated for by the slope of the faces 38. The upward movement of the rack is about twice the downward movement of the lever nose. The comparatively great length of the lever and the small movement required at the lever nose also minimize the change in condition of plumbness of the connection from the lever nose to the power sector. Because of the fact that the change in condition of plumbness of the connection is negligible the pendulum may be made to swing at right angles to the lever without introducing liability of error and since the chart is operated by a rack which moves in a straight line the chart axis may be made to extend at right angles to the line of movement of the rack. Hence, with the particular combination of lever, load-counterbalancing pendulum and indicator-operating device employed, the parts may be so folded together that the chart extends back along the lever and the mechanism may be made to occupy a minimum of space and yet be arranged for ease of assembly, reliability and convenience in use.

The C-shaped frame 25 which encircles the chart and supports the platform spider enables the chart to be made in one section, thus avoiding the difficulties inherent in divided charts as well as achieving greater compactness.

The scale is provided with a dashpot mechanism (best shown in Figures IV and V) to damp the movement of the weighing mechanism, thus protecting the weighing and indicating mechanism from injury due to shocks when heavy loads are thrust upon the platform, and causing the indicator to come to rest quickly in proper indicating position. The dashpot 66 is inserted through an opening formed in the base 1 and is fixed in place by being screwed into a combined cover and retainer 67 which is secured to the bracket 37. The dashpot is adapted to contain oil or other fluid in which is immersed a plunger (not shown). A plunger stem 68, having its lower end fixed to the plunger, extends upwardly through an opening in the cover 67 and is pivotally attached, as at 69, to a yoke 70, which, in turn, is pivotally supported, as at 71, upon the bifurcated branch 19 of the lever 9. A check link 72, pivotally connected at one of its ends to the yoke 70 and at the other of its ends to the bracket 56, serves to hold the yoke 70 upright and at the same time to permit it to move up and down with the lever 9.

Pivotally mounted upon the bracket 37 and turnable upon an axis which coincides with the reading line 65 is a plate 73 and a similar plate 74 is pivotally supported on the bracket 56 and is swingable about the same axis. The plates 73 and 74 are rigidly connected by rods 75 and 76, the plates and rods thus forming a rigid frame capable of tilting about an axis coinciding with the index line 65. (See Figures II, III and IV.) The tilting frame is manipulated by means of a winged knob 77 fixed to one end of a rockshaft 78, the other end of the rockshaft carrying an arm 79. The arm 79 is pivotally connected to the lower end of a link 80, the upper end of the link being pivotally connected, as at 81, to the rod 76.

In order to hold the device in adjusted position, a brake 82, in the form of a coil of wire, is interposed between the knob and the wall of a surrounding recess in the housing, the ends of the coil being hooked into the knob in the manner illustrated in Figure XI, so that when the knob is turned in either direction it tends to wind up the coil and thus lessen its diameter. A lug 83, fixed to the rockshaft, projects between the hooked ends of the coil 82 in the manner illustrated in Figure XI, so that whenever the rockshaft 78 tends to turn, the lug engages one of the hooked ends of the coil and tends to unwind it, thus increasing its diameter and causing it to bind against the wall of the recess.

Mounted upon the rods 75 and 76, by means of rollers 84, 85 and 86, is a lens frame 87 carrying lenses 88 and lens cells 89. (See Figures II, IX and X.) The lenses and cells are arranged in the manner described in detail in above-mentioned United States Patent 1,973,685. Shifting of the lens frame, lenses and cells along the rods 75 and 76 is accomplished by turning a winged knob 90 which is fixed to one end of a rockshaft 91, the other end of the rockshaft carrying an arm 92, there being a pin 93 fixed at the free end of the arm 92. The pin 93 engages a slot 94 in the lower end of a lever 95, the lever 95 being pivoted at approximately its center to a bracket 96 which is fixed to the base 1. The upper end of the lever is provided with a pin 97 which engages a slot in a downwardly extending arcuate member 98 fixed to the lens frame 87. To hold the lens frame at one or the other of its limits of movement, a coil spring 99 is connected to the pin 93 and the bracket 96 in the manner shown in Figures II and IV, so that after the lens frame has moved in either direction beyond central position, the spring tends to pull the lens frame to its limit of movement.

In order to cover the space left vacant when the lenses are moved from the position in which they are shown in Figure IX to the position in which they are shown in Figure X there is provided a pair of pivoted shutters 100 and 101 which are mounted upon the bracket 56 to pivot on an axis coincident with the tilting axis of the frame formed by the plates 73 and 74 and the rods 75 and 76. The shutters are urged toward their position of Figure X by contractile springs 102 and 103, but are forced apart and held apart by the action of lugs 104 and 105 which engage cam surfaces 106 and 107 on the shutters when the lens frame is shifted to the right.

The means for illuminating the merchant's side of the chart is to be made the subject matter of another application and, therefore, is not shown or described in the instant application.

Secured to the bosses in the base and rising therefrom at the customer's side of the chart 61 is a bracket 108 which pivotally supports, as at 109, one end of a push-and-pull check link 110, the other end of the check link being pivotally connected, as at 111, to the C-shaped frame 25 which supports the goods platform. The relationship of the pivots at the ends of the push-and-pull check link 110 and the fulcrum and load pivots of the lever 9 is such as to form a parallelogram. By reason of the fact that the load pivots 21 and 22 are located at a great distance below the point 111 at which the check link 110 is connected to the C-shaped frame, the force which tends to shift the load bearings on the load pivots, with a load at the extreme right or extreme left side of the goods platform, is reduced nearly to the vanishing point and binding and friction such as may be set up in scales having the load pivots close to the goods platform are obviated.

The bracket 108 also supports a corridor 112, of frusto-pyramidal form, through which the customer may view the weight indicia 64 from different positions. (See Figure XII.) The floor 113 of the corridor 112 is made translucent and an illuminating lamp 114 is mounted directly beneath the floor, thereby affording pleasing and effective illumination of the customer's indication.

If it be desired to remove the chart for replacement or other service, such removal may be accomplished without disorganizing the weighing mechanism. In effecting the removal of the chart, the bracket 56 is first removed. By loosening some of the fastenings the plate 74 and the parts carried thereby may be then swung out of the way and the chart withdrawn.

For the purpose of protecting the scale mechanism and making the appearance of the scale attractive, I provide a casing 115, which may be emplaced by first removing the goods platform. The casing rests upon the upturned sides of the pan-like base 1 and the casing is provided with protuberances 116 over which a thimble 117 is placed. For the purpose of drawing tight the joint between the casing and base, fingers 118 are provided which extend into the lower sides of the thimbles 117 and may be drawn downwardly by means of cap screws 119 passing through holes in the base and screwing into threaded holes in the fingers.

The upper longitudinal corners of the casing 115 are rounded and the rounded corners are provided with a long curved glass window 120 which overlies the lenses on the merchant's side of the scale and a short curved glass window 121 which overlies the corridor 112 on the customer's side of the scale. The opening in the casing around the loading box 32 is surrounded by an upstanding collar 122 and the platform spider 33 is provided with a skirt 123 which surrounds the collar 122, the skirt and collar thus forming baffles which inhibit the ingress of dirt.

In the preferred form of the device shown, the cylindrical chart occupies the central part of the box-like casing, while the lever, the check link and the reading devices occupy the corner spaces. The branch 18 of the lever lies along one lower corner and the branch 19 lies along the other lower corner. The check link 110 lies along one upper corner, while the merchant's magnifying reading device occupies the other upper corner.

The embodiment of my invention herein shown and described is to be regarded as illustrative only, and it is to be understood that the invention is susceptible to variation, modification and change within the spirit and scope of the subjoined claims.

Having described my invention, I claim:—

1. In a device of the class described, in combination, a substantially rectangular base, a lever having two main branches, one end of said lever being fulcrumed at one end of said base, the lever branches lying respectively along parallel sides of said base, a bracket erected upon said base at the end opposite to that at which said lever is fulcrumed, flexible metallic ribbons secured to said bracket, a pendulum supported by said flexible metallic ribbons, means connecting said pendulum to the end of said lever remote from its fulcrum, an undivided cylindrical chart lying above said lever and having its cylindrical axis extending nearly parallel to said branches, the length of the cylindrical axis of said chart being nearly co-extensive with the length of said lever, means operatively connecting said pendulum and said chart to turn said chart about its axis upon movement of said pendulum, a substantially C-shaped frame supported upon said lever intermediate the lever ends and partially encircling said chart, a check link supporting bracket erected upon said base adjacent the end at which said lever is fulcrumed, a check link extending parallel to said lever, one end of said check link being pivotally connected to said check link supporting bracket, the other end of said check link being pivotally connected to said C-shaped member, a casing covering the aforesaid mechanism, said casing having a window on one side through which a portion of said chart is visible and a window on the opposite side through which a portion of said chart is visible, and a goods receiver supported by said C-shaped member and lying above said casing, said goods receiver being symmetrically located above said chart.

2. In a device of the class described, in combination, a substantially rectangular base, a lever, one end of said lever being fulcrumed at one end of said base, a bracket erected upon said base at the end opposite to that at which said lever is fulcrumed, flexible metallic ribbons secured to said bracket, a pendulum supported by said flexible metallic ribbons, means connecting said pendulum to the end of said lever remote from its fulcrum, an undivided cylindrical chart lying above said lever and having its cylindrical axis extending nearly parallel to said lever, the length of the cylindrical axis of said chart being nearly co-extensive with the length of said lever, means operatively connecting said pendulum and said chart to turn said chart about its axis upon movement of said pendulum, a substantially C-shaped frame supported upon said lever intermediate the lever ends and partially encircling said chart, a check link supporting bracket erected upon said base adjacent the end at which said lever is fulcrumed, a check link extending parallel to said lever, one end of said check link being pivotally connected to said check link supporting bracket, the other end of said check link being pivotally connected to said C-shaped member, a casing covering the aforesaid mechanism, said casing having a window on one side through which a portion of said chart is visible and a window on the opposite side through which a portion of said chart is visible, and a goods receiver supported by said C-shaped member and lying above said casing, said goods receiver being symmetrically located above said chart.

3. In a device of the class described, in combination, a substantially rectangular base, a lever having two main branches, one end of said lever being fulcrumed at one end of said base, the lever branches lying respectively along parallel sides of said base, a bracket erected upon said base at the end opposite to that at which said lever is fulcrumed, flexible metallic ribbons secured to said bracket, a pendulum supported by said flexible metallic ribbons, means connecting said pendulum to the end of said lever remote from its fulcrum, an undivided cylindrical chart lying above said lever and having its cylindrical axis extending nearly parallel to said branches, the length of the cylindrical axis of said chart being nearly co-extensive with the length of said lever, means operatively connecting said pendulum and said chart to turn said chart about its axis upon movement of said pendulum, a substantially C-shaped frame supported upon said lever intermediate the lever ends and partially encircling said chart, a casing covering the aforesaid mechanism, said casing having a window on one side through which a portion of said chart is visible and a window on the opposite side through which a portion of said chart is visible, and a goods receiver supported by said C-shaped member and lying above said casing, said goods receiver being symmetrically located above said chart.

4. In a device of the class described, in combination, a substantially rectangular base, a lever, one end of said lever being fulcrumed at one end of said base, a bracket erected upon said base at the end opposite to that at which said lever is fulcrumed, flexible metallic ribbons secured to said bracket, a pendulum supported by said flexible metallic ribbons, means connecting said pendulum to the end of said lever remote from its fulcrum, an undivided cylindrical chart lying above said lever and having its cylindrical axis extending nearly parallel to said lever, the length of the cylindrical axis of said chart being nearly co-extensive with the length of said lever, means operatively connecting said pendulum and said chart to turn said chart above its axis upon movement of said pendulum, a substantially C-shaped frame supported upon said lever intermediate the lever ends and partially encircling said chart, a casing covering the aforesaid mechanism, said casing having a window on one side through which a portion of said chart is visible and a window on the opposite side through which a portion of said chart is visible, and a goods receiver supported by said C-shaped member and lying above said casing, said goods receiver being symmetrically located above said chart.

5. In a device of the class described, in combination, a lever, one end of said lever being fulcrumed, a bracket, flexible metallic ribbons secured to said bracket, a pendulum supported by said flexible metallic ribbons, means connecting said pendulum to the end of said lever remote from its fulcrum, an undivided cylindrical chart lying above said lever and having its cylindrical axis extending nearly parallel to said lever, the length of the cylindrical axis of said chart being nearly co-extensive with the length of said lever, means operatively connecting said pendulum and said chart to turn said chart about its axis upon movement of said pendulum, a substantially C-shaped frame supported upon said lever intermediate the lever ends and partially encircling said chart, a casing covering the aforesaid mechanism, said casing having a window on one side through which a portion of said chart is visible and a window on the opposite side through which a portion of said chart is visible, and a goods receiver supported by said C-shaped member and lying above said casing, said goods receiver being symmetrically located above said chart.

6. In a device of the class described, in combination, a lever, one end of said lever being fulcrumed, a bracket, flexible metallic ribbons secured to said bracket, a pendulum supported by said flexible metallic ribbons, means connecting said pendulum to the end of said lever remote from its fulcrum, an undivided cylindrical chart lying above said lever and having its cylindrical axis extending nearly parallel to said lever, the length of the cylindrical axis of said chart being nearly co-extensive with the length of said lever, means operatively connecting said pendulum and said chart to turn said chart about its axis upon movement of said pendulum, a substantially C-shaped frame supported upon said lever intermediate the lever ends and partially encircling said chart, a casing covering the aforesaid mechanism, and a goods receiver supported by said C-shaped member and lying above said casing, said goods receiver being symmetrically located above said chart.

7. In a device of the class described, in combination, a lever, one end of said lever being fulcrumed, a bracket, flexible metallic ribbons secured to said bracket, a pendulum supported by said flexible metallic ribbons, means connecting said pendulum to the end of said lever remote from its fulcrum, an undivided cylindrical chart lying above said lever and having its cylindrical axis extending nearly parallel to said lever, means operatively connecting said pendulum and said chart to turn said chart about its axis upon movement of said pendulum, a substantially C-shaped frame supported upon said lever intermediate the lever ends and partially encircling said chart, a casing covering the aforesaid mechanism, and a goods receiver supported by said C-shaped member and lying above said casing, said goods receiver being symmetrically located above said chart.

8. In a device of the class described, in combination, a base, a lever having two main branches, one end of said lever being fulcrumed at one end of said base, a bracket erected upon said base at the end opposite to that at which said lever is fulcrumed, a pendulum, means connecting said pendulum to the end of said lever remote from its fulcrum, an undivided cylindrical chart lying above said lever and having its cylindrical axis extending nearly parallel to said branches, the length of the cylindrical axis of said chart being nearly co-extensive with the length of said lever, means operatively connecting said pendulum and said chart to turn said chart about its axis upon movement of said pendulum, a substantially C-shaped frame supported upon said lever intermediate the lever ends and partially encircling said chart, a casing covering the aforesaid mechanism, and a goods receiver supported by said C-shaped member and lying above said casing, said goods receiver being symmetrically located above said chart.

9. In a device of the class described, in combination, a base, a lever having two main branches, one end of said lever being fulcrumed at one end of said base, a bracket erected upon said base at the end opposite to that at which said lever is fulcrumed, a pendulum, means connecting said pendulum to the end of said lever remote from its fulcrum, an undivided cylindrical chart lying above said lever and having its cylindrical axis extending nearly parallel to said branches, the length of the cylindrical axis of said chart being nearly co-extensive with the length of said lever, means operatively connecting said pendulum and said chart to turn said chart about its axis upon movement of said pendulum, a substantially C-shaped frame supported upon said lever intermediate the lever ends and partially encircling said chart, a casing covering the aforesaid mechanism, and a goods receiver supported by said C-shaped member and lying above said casing.

10. In a device of the class described, in combination, a lever, one end of said lever being fulcrumed, an automatic load-counterbalance, means connecting said automatic load-counterbalance to the end of said lever remote from its fulcrum, an undivided cylindrical chart lying above said lever and having its cylindrical axis extending nearly parallel to said lever, the length of the cylindrical axis of said chart being nearly co-extensive with the length of said lever, means operatively connecting said automatic load-counterbalance and said chart to turn said chart about its axis upon movement of said automatic load-counterbalance, a substantially C-shaped frame supported upon said lever intermediate the lever ends and partially encircling said chart, a casing covering the aforesaid mechanism, and a goods receiver supported by said C-shaped member and lying above said casing.

11. In a device of the class described, in combination, a lever, one end of said lever being fulcrumed, a bracket, an automatic load-counterbalance, means connecting said automatic load-counterbalance to the end of said lever remote from its fulcrum, an undivided cylindrical chart lying above said lever and having its cylindrical axis extending nearly parallel to said lever, the length of the cylindrical axis of said chart being nearly co-extensive with the length of said lever, means operatively connecting said automatic load-counterbalance and said chart to turn said chart about its axis upon movement of said automatic load-counterbalance, a frame supported upon said lever intermediate the lever ends and partially encircling said chart, a casing covering the aforesaid mechanism, and a goods receiver supported by said frame and lying above said casing.

12. In a weighing scale, in combination, a box-like casing, a frame covered by said casing, a horizontally extending undivided cylindrical chart supported by said frame and located substantially centrally within said casing, a lever supported by said frame and having members occupying the spaces between the chart and the lower longitudinal corners of the casing, means connecting said lever and said chart to rotate said chart upon movement of said lever, a commodity-receiver supported by said lever and lying above said casing, and a check link connected to said frame and said commodity-receiver and occupying the space between said chart and an upper longitudinal corner of said casing.

13. In a device of the class described, in combination, a frame, scale mechanism including a cylindrical chart mounted on said frame, a casing of synthetic plastic material housing said scale mechanism, registering bosses on said frame and casing, and a member encircling said bosses to fasten said casing to said frame.

14. In a device of the class described, in combination, a frame, bearings supported by said frame, a lever, pivots fixed to said lever and engaging said bearings to support said lever, and resilient means articulated with said lever on an axis substantially coincident with the axis of movement of said pivots on said bearings and yieldingly pressing said pivots against said bearings.

15. In a device of the class described, in combination, a frame, bearings supported by said frame, a lever, knife-edged pivots fixed to said lever and engaging said bearings to support said lever, a sharp pivot fixed to said lever and extending oppositely to said knife-edged pivots, the sharp end of said sharp pivot being substantially in alignment with the edges of said knife-edged pivots, a bearing engaged with the sharp end of said sharp pivot, and a spring member connecting the last said bearing with said frame.

16. In a device of the class described, in combination, a frame, a pair of spaced bearings on said frame, a lever, a pair of pivots fixed to said lever and engaging said bearings to support said lever, a third pivot fixed to the nose of said lever, and resilient means for yieldingly restraining said lever from tilting about an axis extending between one of the pivots of said pair and said third pivot.

HALVOR W. HEM.